US010350977B2

(12) United States Patent
Babbage et al.

(10) Patent No.: US 10,350,977 B2
(45) Date of Patent: Jul. 16, 2019

(54) COLLAPSIBLE COVER FOR VEHICLE WINDOW OR DOOR

(71) Applicant: FORD GLOBAL TECHNOLOGIES, LLC, Dearborn, MI (US)

(72) Inventors: Jason Michael Babbage, Allen Park, MI (US); Henry W Hausler, Manchester, MI (US); Danielle Marie Rodriguez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 15/287,270

(22) Filed: Oct. 6, 2016

(65) Prior Publication Data

US 2018/0099550 A1 Apr. 12, 2018

(51) Int. Cl.
| *B60J 11/06* | (2006.01) |
| *B60J 5/06* | (2006.01) |
| *B60J 5/12* | (2006.01) |
| *B60J 1/20* | (2006.01) |
| *B60J 7/00* | (2006.01) |

(52) U.S. Cl.
CPC ............... *B60J 5/06* (2013.01); *B60J 1/2088* (2013.01); *B60J 1/2091* (2013.01); *B60J 5/12* (2013.01); *B60J 7/0007* (2013.01)

(58) Field of Classification Search
CPC . B60J 1/2088; B60J 1/2091; B60J 5/06; B60J 5/12; B60J 7/042
USPC .................. 296/152, 146.13, 97.4, 97.8, 219
See application file for complete search history.

(56) References Cited

U.S. PATENT DOCUMENTS

| 1,708,636 | A | * | 4/1929 | Shook | ..................... B60J 1/2088 160/118 |
| 2,861,836 | A | * | 11/1958 | Goeggel | ................... B60J 7/047 160/193 |
| 5,335,961 | A | | 8/1994 | Reinsch et al. | |
| 5,634,682 | A | * | 6/1997 | Young | ..................... B60J 1/2088 296/97.4 |
| 6,041,843 | A | | 3/2000 | Mullet | |
| 6,257,651 | B1 | * | 7/2001 | Morbach | ..................... B60J 5/14 160/202 |
| 6,767,043 | B1 | * | 7/2004 | Sanseviero | .............. B60J 7/062 296/100.03 |

(Continued)

FOREIGN PATENT DOCUMENTS

| CN | 201023411 Y | 2/2008 |
| CN | 102555740 B | 5/2014 |

OTHER PUBLICATIONS

English Machine Translation of CN102555740B.
English Machine Translation of CN201023411Y.

*Primary Examiner* — Jason S Morrow
(74) *Attorney, Agent, or Firm* — Jason Rogers; Vichit Chea; King & Schickli, PLLC

(57) ABSTRACT

An apparatus for partially covering a door or window opening in a vehicle comprises a collapsible cover. The cover may include a plurality of movable members adapted for moving along a support to at least partially expose the door or window opening. A plurality of movable members in the form of panels may be provided, along with actuators for rotating and/or moving one or more of the panels between the raised and collapsed configuration. One or more of the panels may be at least partially transparent or translucent, and seals may be provided for sealing the panels within the opening.

15 Claims, 18 Drawing Sheets

(56) References Cited

U.S. PATENT DOCUMENTS

| | | | |
|---|---|---|---|
| 8,726,970 B2 | 5/2014 | Young | |
| 9,033,022 B2* | 5/2015 | Katada | B60J 1/2038 160/265 |
| 2003/0085007 A1* | 5/2003 | Hintennach | B60J 1/2088 160/370.21 |
| 2006/0108825 A1* | 5/2006 | Petty | B60J 1/2088 296/100.04 |
| 2014/0318718 A1* | 10/2014 | Seehof | E06B 7/28 160/127 |
| 2017/0327158 A1* | 11/2017 | Babbage | B60D 1/015 |

* cited by examiner

COLLAPSIBLE COVER FOR VEHICLE WINDOW OR DOOR

TECHNICAL FIELD

This document relates generally to the motor vehicle field and, more particularly, to a collapsible cover for a vehicle window or door.

BACKGROUND

Motorized passenger vehicles such as cars and pick-up trucks often include or doors windows that may be selectively opened to admit air into a passenger compartment. In the case of a window, opening and closing may typically be achieved by raising or lowering a single panel of glass recessed within a panel of the vehicle, such as the door. In some locations, such as a back or rear side of a pickup truck cab, providing a window that can be recessed within the adjacent body panel may be a challenge in view of the limited space available for storing a fixed height piece of glass in a fully recessed position.

Vehicle doors are typically mounted for pivoting or sliding between a closed condition and an open condition projecting from the vehicle. This can also be a problem when space is limited for opening the door. Most doors are also heavy, especially those that slide, and are typically secured in place by complex latching mechanisms.

Thus, a need is identified for a collapsible vehicle window or door that can occupy an opening in a vehicle where internal or external space is at a premium, or also when a simplified manner of manually retracting or collapsing and deploying the window or door is desired.

SUMMARY

In accordance with the purposes and benefits described herein, an apparatus includes a vehicle including a window or door opening and a collapsible cover for selectively closing and exposing the window or door opening. The cover may comprise at least one member adapted for pivoting within the window or door opening and for translating to and fro relative to the opening, the at least one of the member being at least partially transparent or translucent for admitting light through the window or door opening when closed.

In one embodiment, the collapsible cover further includes a plurality of members adapted for pivoting within the window or door opening and for being translated to and fro relative to the opening. The or each member may be mounted to a support for rotating between a closed position in alignment with the support and an open position transverse to the support. An actuator may also be provided for moving the members along the support, and an actuator may also be adapted for rotating the members between an open position and a closed position. An embodiment of the actuator comprises an endless loop connected to a handle associated with the support for translating the members relative to the window or door opening.

The apparatus may further include at least one connector associated with the members, and a guide for guiding the connector to lower the members and at least partially expose the opening. Each of the members may be at least partially transparent or translucent, and may comprise glass. A seal may also be provided for sealing one of the members to an adjacent member or a portion of the vehicle forming the opening.

The window or door opening may comprises a window opening formed in a roof of the vehicle. Alternatively or additionally, the window or door opening comprises a door opening formed in a sidewall of the vehicle, including along a rear portion having a liftgate.

According to a further aspect of the disclosure, an apparatus comprises a vehicle including a door or window opening and a cover comprising one or more panels for partially covering the door or window opening. The one or more panels may be adapted for rotating from an upright condition to a rotated condition and for moving in a vertical direction from a raised configuration to a collapsed configuration to at least partially expose the door or window opening. Actuators may be provided for rotating and collapsing the panel or panels, which may be at least partially transparent or translucent. A seal may also be provided for sealing one of the panels to an adjacent panel or a portion of the vehicle forming the window or door opening.

Still a further aspect of the disclosure pertains to an apparatus for covering a door or window opening in a vehicle. The apparatus may comprise a collapsible cover having at least one panel for partially covering the door or window opening, the one or more panels adapted for rotating from an upright condition to a rotated condition and for moving in a vertical direction from a raised configuration to a collapsed configuration to at least partially expose the door or window opening, and further including a seal for sealing the panel within the opening. In one embodiment, the cover includes a plurality of panels, each of the plurality of panels having a seal for sealing with an adjacent panel or a peripheral portion of the door or window opening.

In the following description, there are shown and described several preferred embodiments of the collapsible cover for a vehicle window or door opening. As it should be realized, the arrangement is capable of other, different embodiments and its several details are capable of modification in various, obvious aspects all without departing from the collapsible cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the collapsible cover for a vehicle window or door opening and, together with the description, serve to explain certain principles thereof. In the drawing figures:

FIGS. 1 and 2 are partially cutaways view of a collapsible cover for a vehicle window or door opening taken from the side of a vehicle in the form of a pickup truck;

FIGS. 3, 4, and 5 are schematic views illustrating the collapsible cover arrangement;

Reference will now be made in detail to the present preferred embodiments of the collapsible vehicle window or door arrangement, examples of which are illustrated in the accompanying drawing figures.

DETAILED DESCRIPTION

Figure 1:
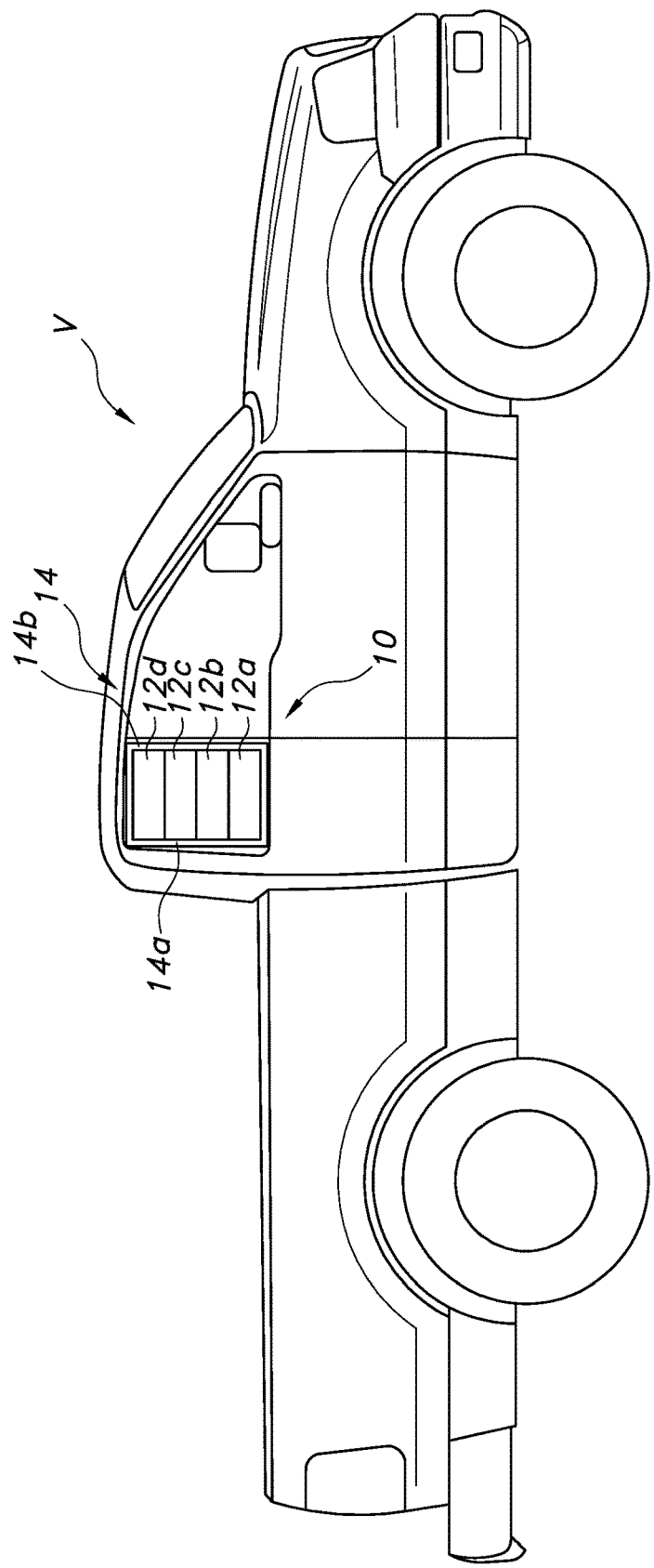
Figure 2:
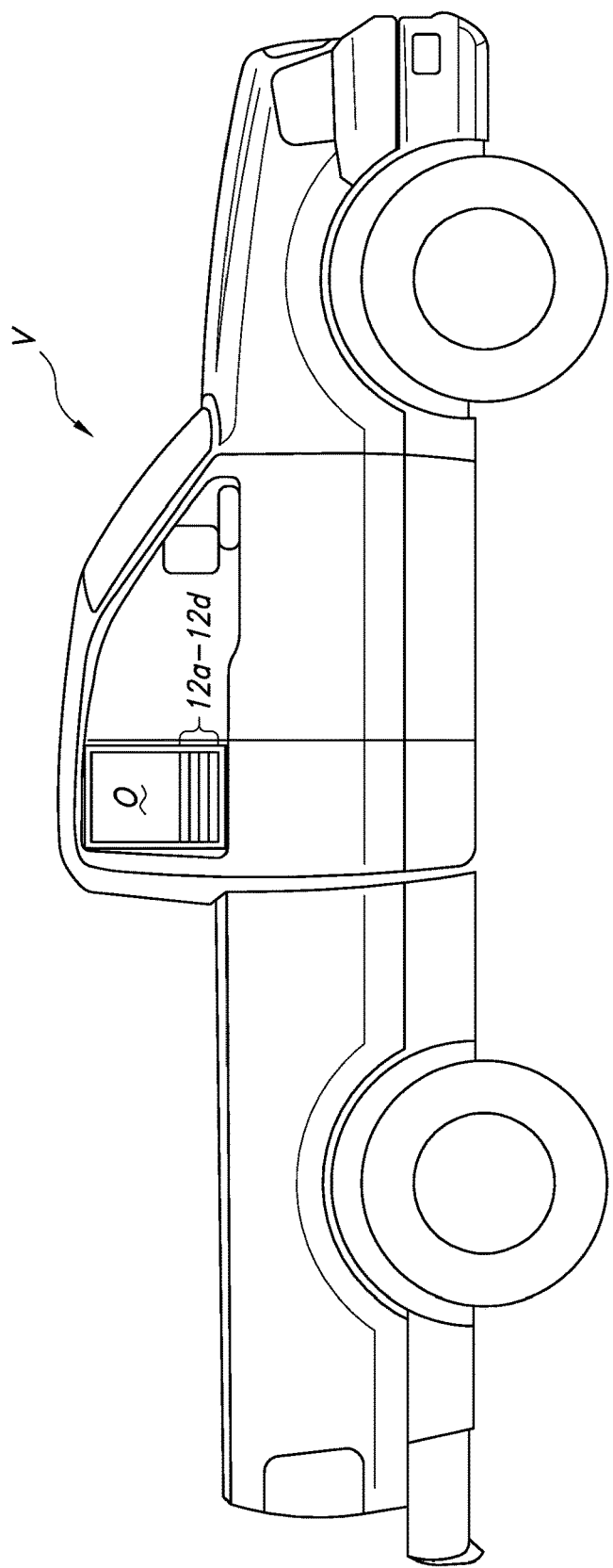

Reference is now made to FIGS. 1 and 2, which illustrate one possible embodiment of a collapsible cover 10 for a window or door opening O for a vehicle V, which is shown in the form of a pickup truck. In the illustrated embodiment, the truck is shown as having an extended cab, and the cover 10 is provided in a window opening O formed in a rear side portion of the cab. As will be understood from comparing FIGS. 1 and 2, and upon further reviewing the description that follows, the cover 10 is adapted for moving from a deployed or erect configuration (FIG. 1) for blocking the opening O, to a retracted or collapsed configuration (FIG. 2) for exposing the opening.

As shown in FIG. 1, the cover 10 includes one or more vertically movable portions or members, such as four elongated slats or panels 12a-12d (but more or fewer may be provided depending on the size of the door or window opening O to be covered). The panels 12a-12d may be connected to a stable structure in the form of a support 14, which includes a first side portion 14a and a second side portion 14b between which the panels extend in a direction aligned with a longitudinal axis X (which portions 14a, 14b may comprise separate members attached to the body of the vehicle V, or may be integrated into existing body parts). The support 14 may also comprise a frame corresponding in shape to the periphery of the opening O.

Figure 4:
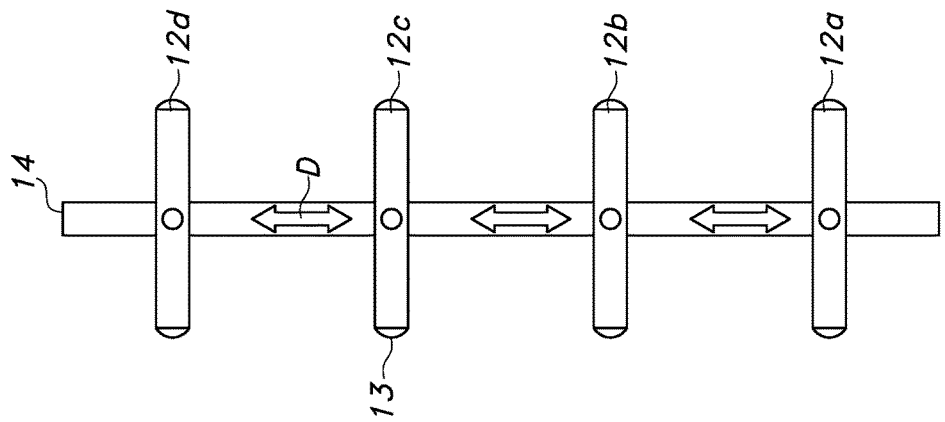
FIG. 4a illustrates one possible arrangement for sealing between adjacent members or panels of the cover, as well as an adjacent portion of the vehicle, as appropriate to create a fluid-impervious covering for the window or door opening.
Figure 4A:
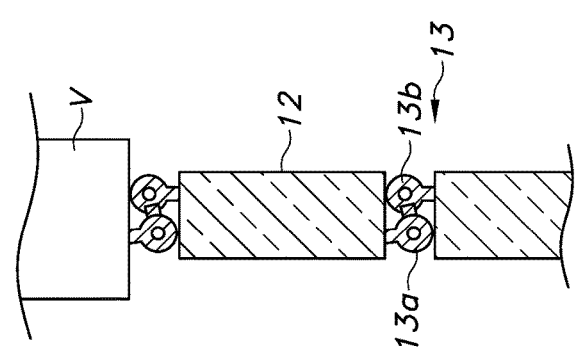

To admit light to the associated portion of the vehicle V, one or all of the panels 12a-12d may be at least partially transparent or translucent (such as by being formed of glass) for admitting light into the passenger compartment of the vehicle V, and thus form a window. However, one or more of the panels 12a-12d could be opaque as well so as to form a door for closing the opening O. The panels 12a, 12d may also be provided with seals 13, which may comprise resilient members such as flaps or protrusions for positioning between adjacent panels or an adjacent portion of the support 14 or vehicle V (in the case of the first and last panels 12a, 12d). Alternatively, as illustrated in FIG. 4a, the seals 13 may comprise interlocking bulb seals 13a, 13b for providing a substantially fluid-impervious barrier.

Figure 3:
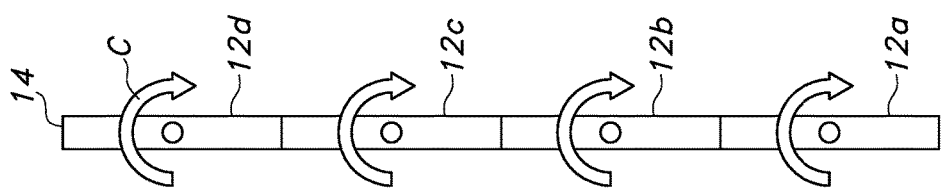

One or more of the panel(s) may be adapted for rotating and then moving along the support 14 from a raised position to a lowered position. Specifically, with reference to the schematic view of FIG. 3, it can be understood that each panel 12a-12d may be mounted for rotation relative to the support 14 (or side portions 14a, 14b in particular) about the longitudinal axis X of the panel (note action arrow C). Once rotated, it can also be appreciated that the panels 12a-12b may move independently relative to the support 14 between a raised position (FIG. 3) to a lowered or collapsed position (FIG. 5), and then returned to the raised position (note double headed action arrows D in FIG. 4). As will be understood upon reviewing the description that follows, this allows for the height of the cover 10 (that is, between side support members 14a, 14b) to be selectively adjusted within the need for storing it in a recessed location, such as within a panel forming part of the vehicle V.

An embodiment of an actuator for causing movement of the panels 12a-12d in the desired manner is shown with reference to FIGS. 6 and 6a-6d. In this embodiment, the actuator is a manually operable one, and includes a first actuator 16 for rotating the panels 12a-12d between an open position and a closed position, and a second actuator 18 for moving one or more of the panels between a raised position and a lowered position. As will be better understood upon reviewing the description that follows, the actuators 16, 18 may work in concert to achieve the desired partial exposure for the opening O.

Taking the first actuator 16 first, it includes a spindle 20 rotatably mounted within the side portion 14a of the support 14. A gearing arrangement may be provided in a gearbox 22, which is connected to and provides support for each panel 12a (only one gearbox shown in FIG. 7 for purposes of clarity). Specifically, the gearbox 22 may be connected to the spindle 20, and may move in a sliding fashion along an axis Y transverse to the longitudinal axis X (the vertical direction in the illustrated version). The spindle 20 may be connected to a lever 26, which may pass through an opening 14c in the side support portion 14a for being manipulated by a user.

Figure 6:
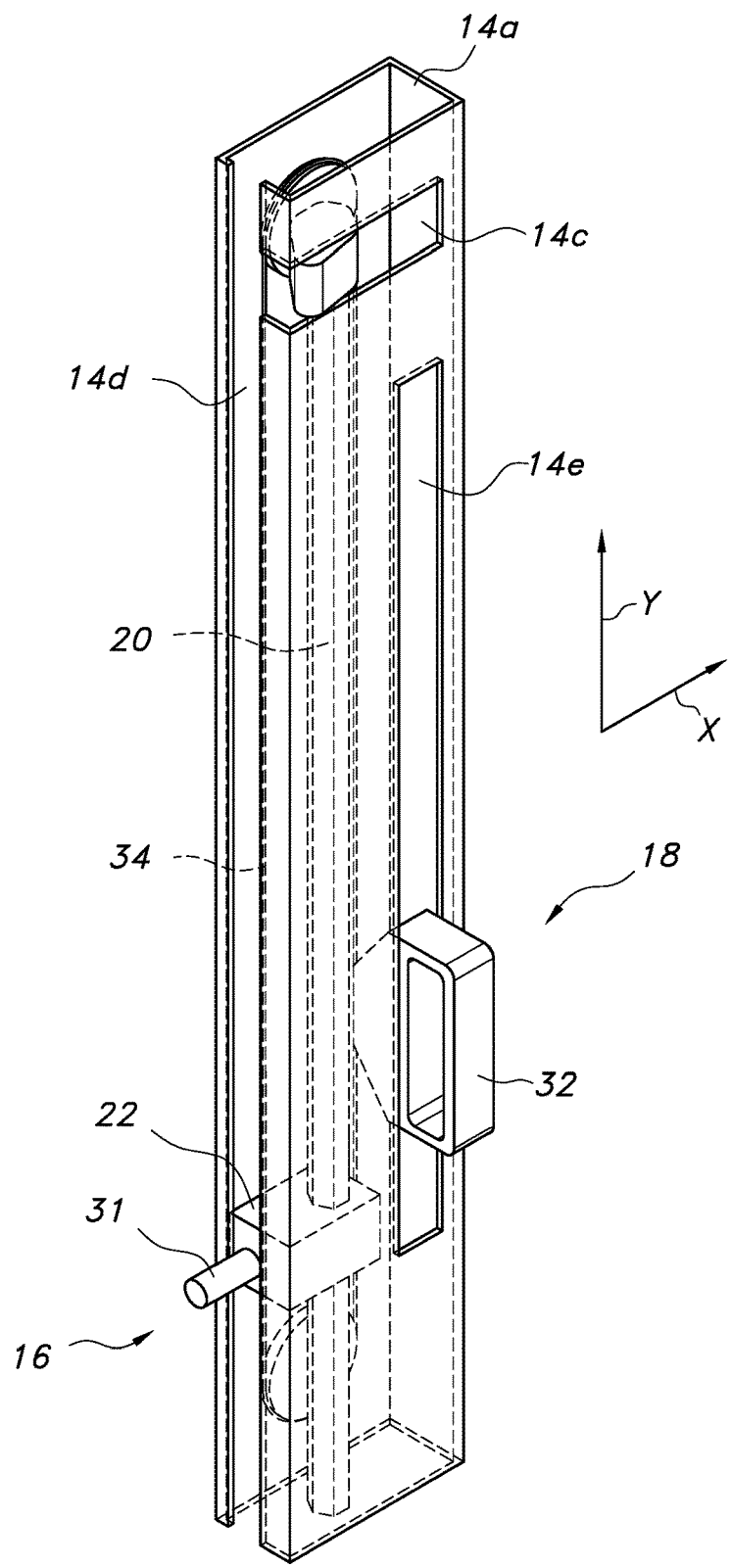
FIGS. 6 and 6a-6d illustrate one embodiment of an actuator for collapsing the cover.
Figure 6A:
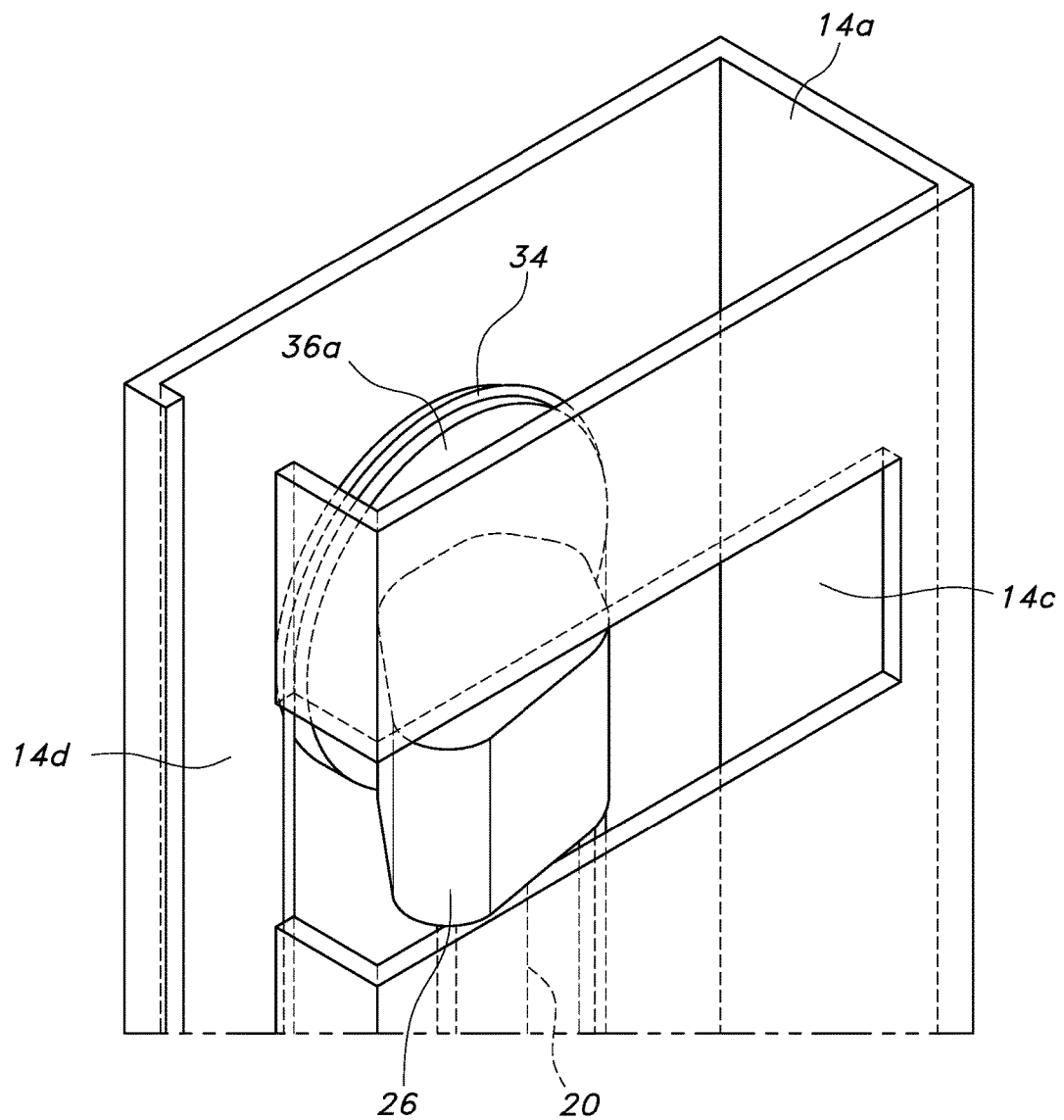
Figure 6B:
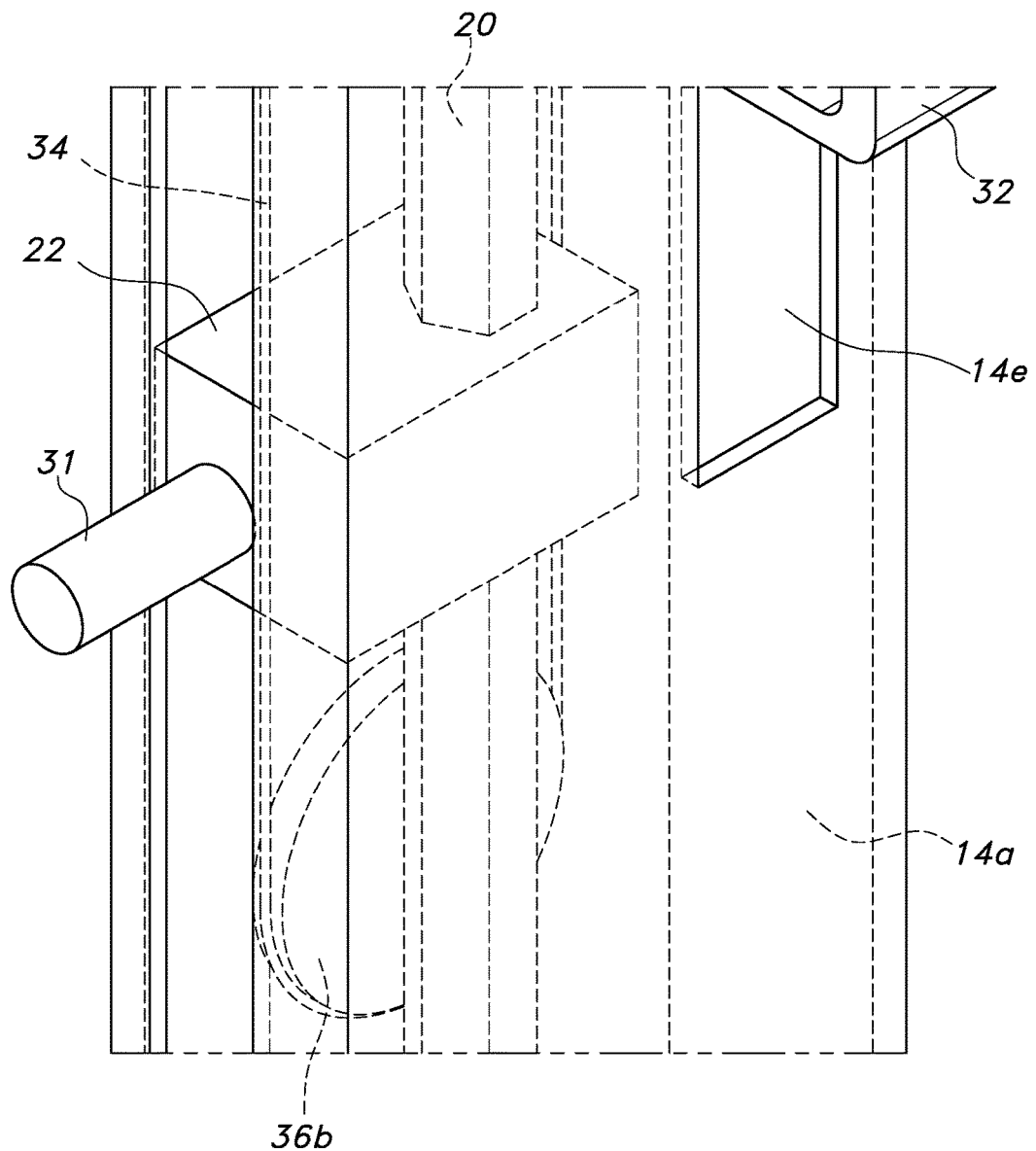
Figure 6C:
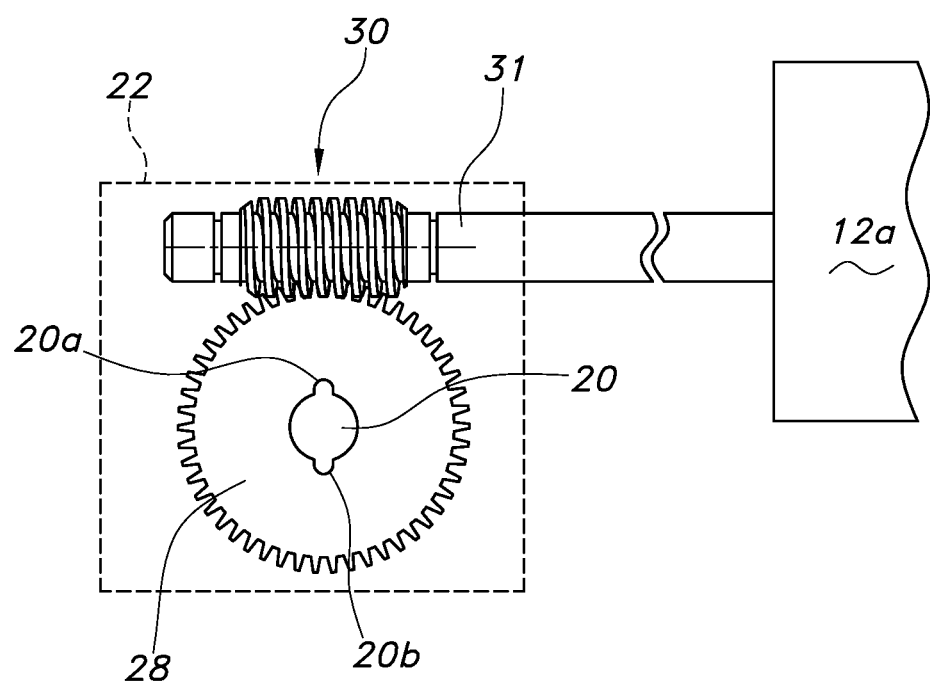

Each gearbox 22 is adapted for translating the rotation of the spindle 20 about the transverse axis Y to rotation of an associated panel 12a connected to it about the longitudinal axis X. As shown in FIG. 6C, the spindle 20 may support a first gear 28 (such as a full or partial spur gear) for engaging a second gear 30 (such as a worm gear) connected to the panel 12a by a connector 31. The connector 31 may simply be an integral part with the gear 30, as shown, and fixed to the corresponding end of the panel 12 associated with the side support portion 14a.

Figure 12:
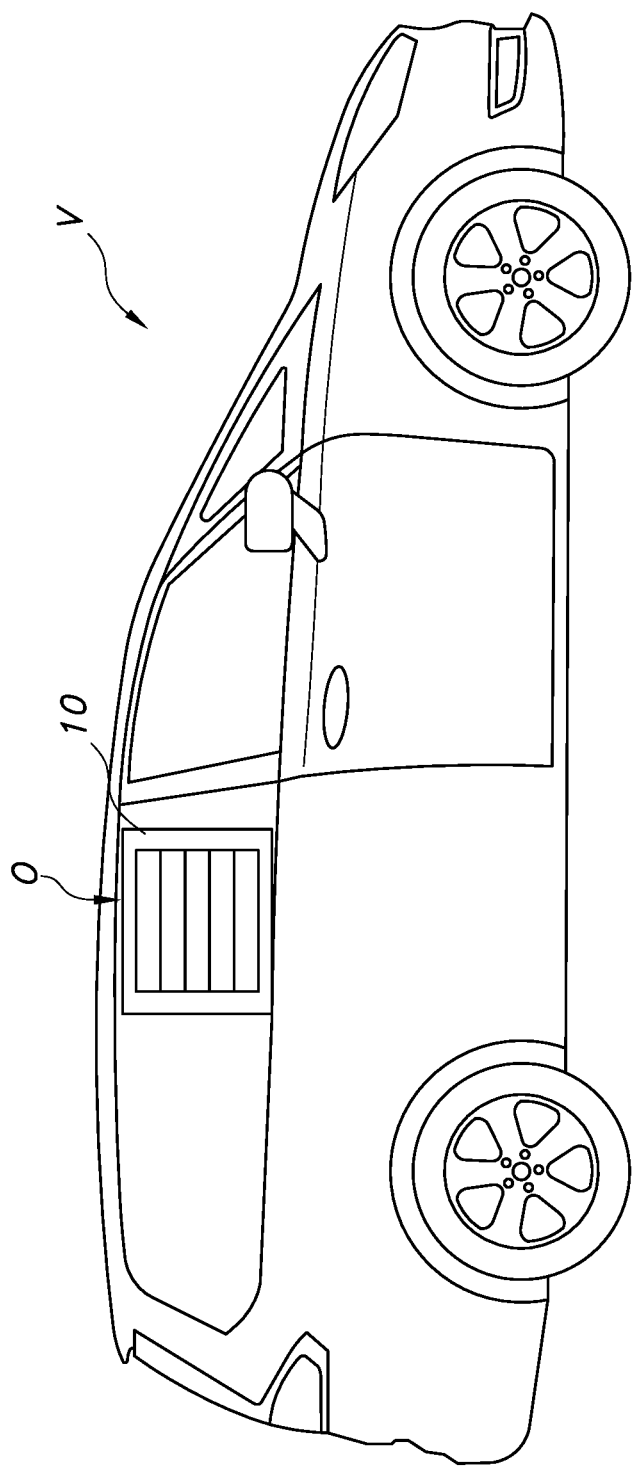

The connector 31 may engage a guide for guiding the movement of the associated panels 12a-12d in a direction aligned with the transverse axis Y (the vertical direction, as shown, but it could be a horizontal movement as well; see FIG. 12). This guide may take the form of an elongated opening 14d or slot in the side support portion 14a forming a track or guide through which the connector 31 passes to connect to the corresponding panel, such as panel 12a. As can be appreciated, this opening 14d is sized so as to not interfere with the rotation of the connector 31 or movement of it in the intended manner. The opposite end of each panel 12a-12d may simply be connected to opposite support side portion 14b by a similar connector passing through an opening to connect with a stationary guide so as to be capable of following the movement, but could also be actuated in a manner similar to that described herein.

In any case, rotation of the first gear 28 about transverse axis Y causes the associated panel 12a to rotate about the longitudinal axis X, moving it from a position aligned with support 14 (that is, with a minor plane parallel to axis Y) to a position transverse with support (that is, with a minor plane perpendicular to axis Y). For reasons better understood upon reviewing the description that follows, the spindle 20 may be provided with cutouts 20a, and first gear 28 may be provided with corresponding transverse projections 20b or keys. This form of engagement allows the rotation of the spindle 20 to rotate the first gear 28 in a positive fashion, while also allowing for sliding movement of the gearbox 22 along the transverse axis Y during the movement of the panels 12b-12d between the raised position and the lowered position.

Figure 6D:
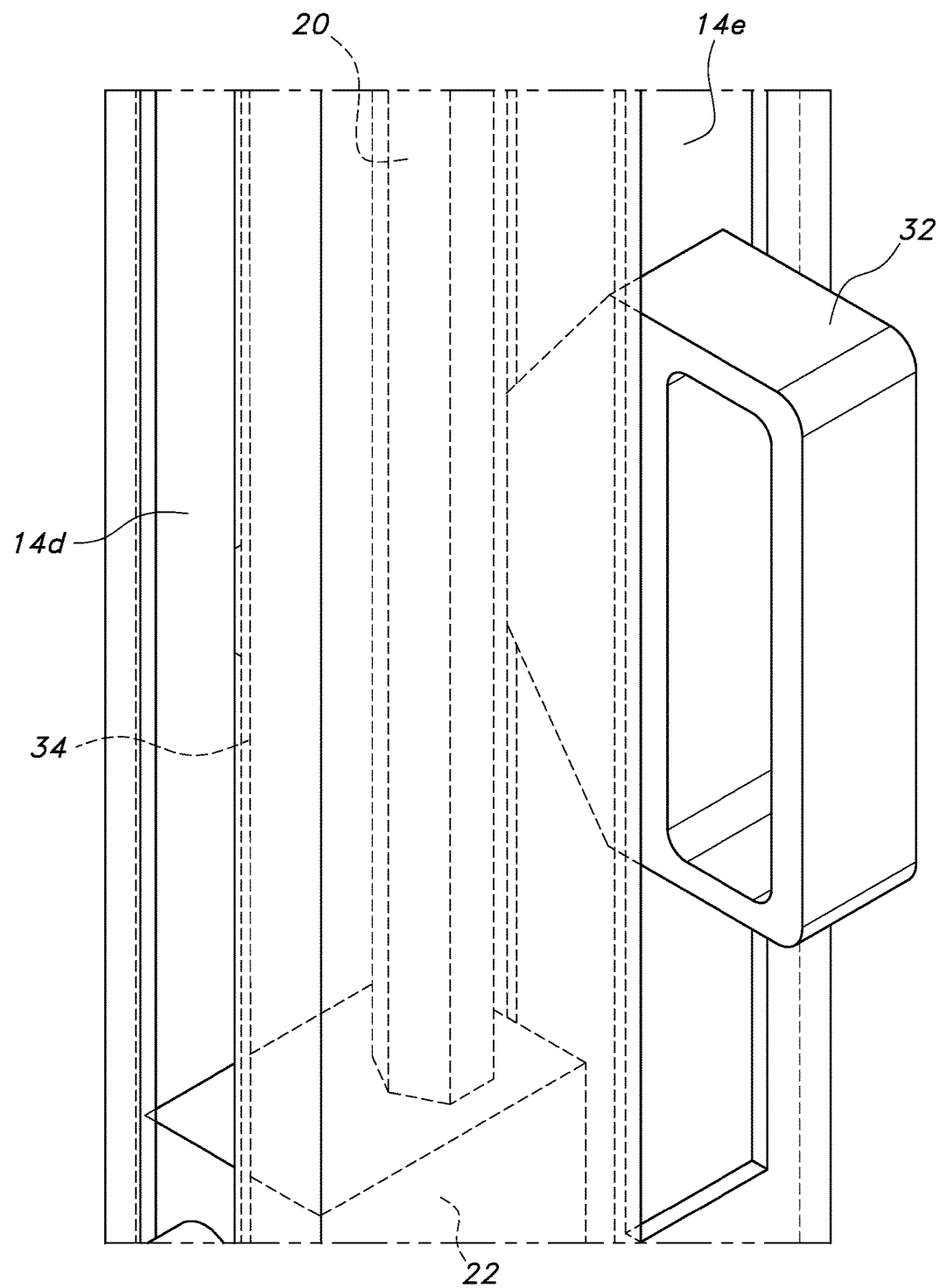
Figure 7:
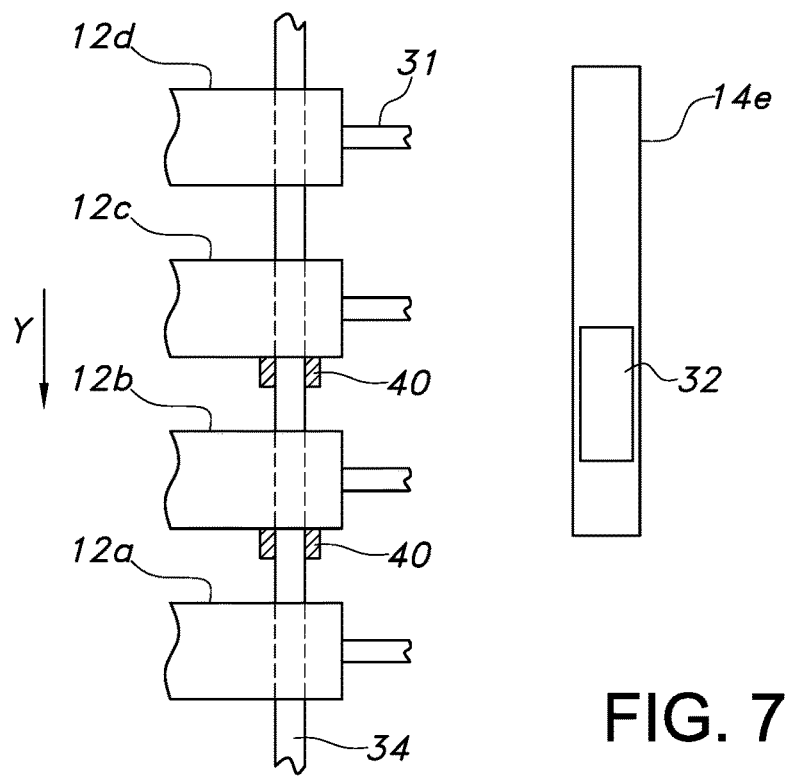
FIGS. 7 and 8 are side schematic views showing the cover in the deployed and collapsed configurations.
Figure 8:
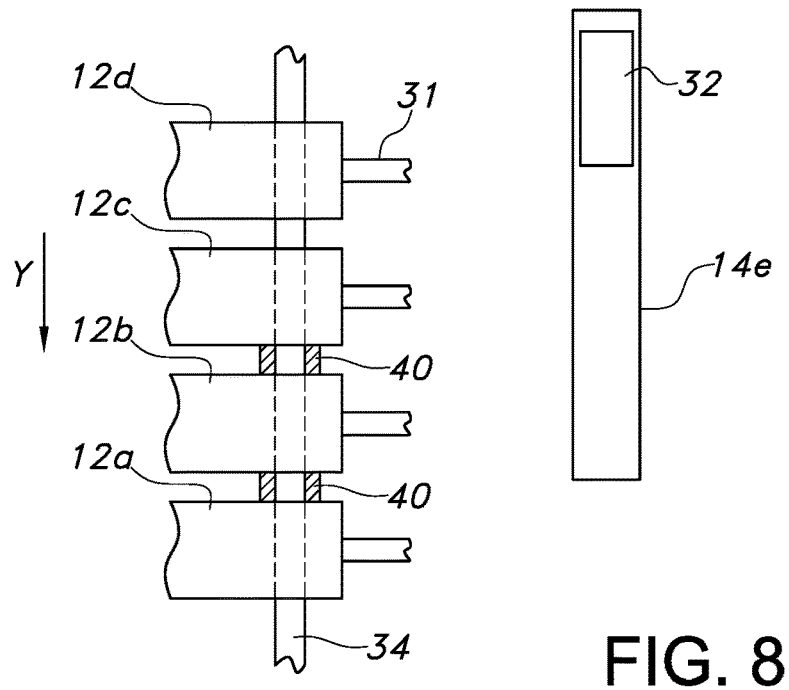

Turning now to the second actuator 18, and with reference to FIGS. 6D, 7 and 8, it may include a handle 32 projecting through a cutout or opening 14e in the support 14 and elongated in a direction aligned with the transverse axis Y. The handle 32 is connected to an endless loop 34 extending over pulleys 36a, 36b rotatably mounted in the side portion 14a of the support 14. Thus, as the handle 32 is moved (raised and lowered), the loop 34 is caused to move to and fro relative to the support 14, and side portion 14a in particular, in an opposite direction.

As shown in FIGS. 7 and 8, it can now be understood that the lowermost panel 12a may simply be arranged such that it does not engage the loop 34 and thus simply rotates relative to the support 14 as a result of the manipulation of the spindle 20. The next adjacent panel or panels 12b, 12c are also not connected to the loop 34, but may be supported by lifters 40 connected thereto. The upper panel 12d is connected to the loop 34 for moving along the transverse (vertical) axis Y in response to the movement of the handle 32.

Figure 5:
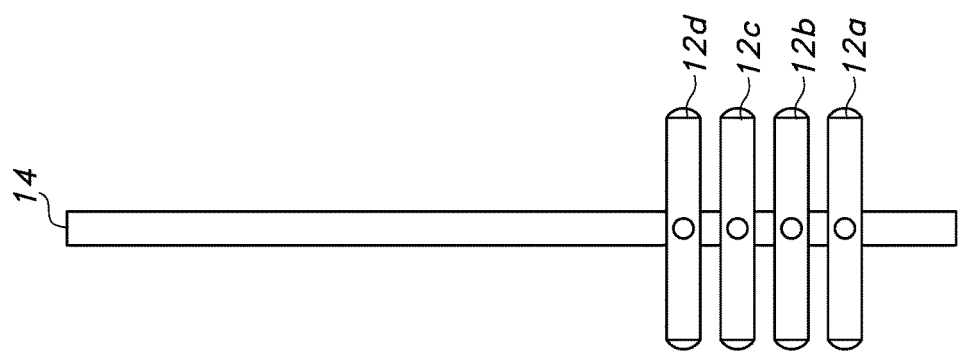

Thus, with continued reference to FIGS. 7 and 8 specifically, it can be understood that movement of the handle 32 along the transverse axis Y in one direction causes movement of the upper panel 12d in the opposite direction as the result of the connection to endless loop 34. Specifically, in the illustrated embodiment, the movement of the handle 32 upwardly from the position shown in FIG. 7 causes the upper panel 12d when rotated as shown in FIG. 4 to move downwardly and engage the next adjacent panel 12c, which in turn engages panel 12b. As a result of the sliding engagement of the associated gearboxes 22, the panels 12a-12c thus move toward panel 12a to reach the collapsed configuration of FIG. 8, more fully exposing the opening O space between support side portions 14a, 14b.

Movement of the handle 32 in the opposite direction (vertically downward) thus raises the upper panel 12d and ultimately returns it to the initial or home position. The concurrent movement of lifters 40 connected to the loop 34 moves intermediate panels 12b and 12c along the transverse axis Y and back to the initial or home (expanded) position. Once the panels 12b-12d have returned to the position shown in Figure, the first actuator 16 may be used to rotate the panels (including lower panel 12a) about the longitudinal axis X to assume the configuration shown in FIG. 4 and thereby cover the opening O.

Figure 9:
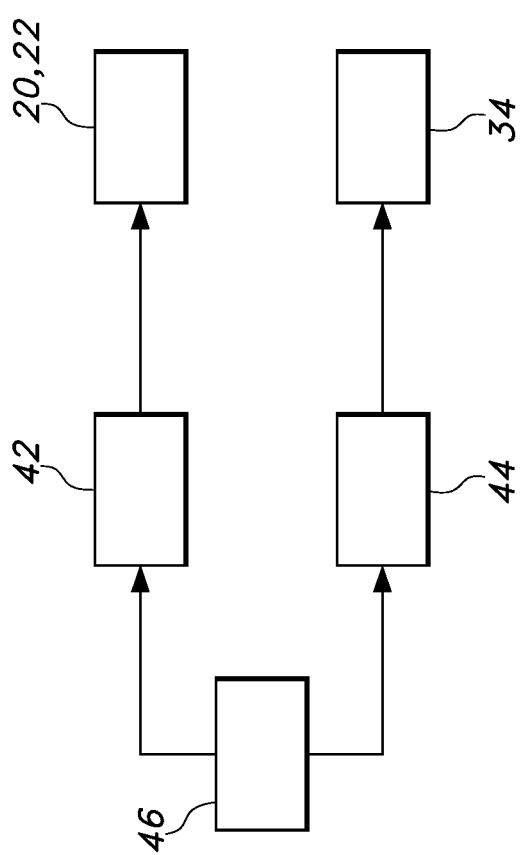
FIG. 9 is a diagrammatic view showing one possible manner of implementing control for the cover.

While a manual configuration is described, it can be appreciated that a powered arrangement may also be used. Specifically, as schematically illustrated in FIG. 9, the first actuator 16 may comprise a motor 42 for rotating the spindle 20, or the gearboxes 22 could simply be motorized Likewise, a motor 44 could be provided for causing the loop 34 for move to and fro for raising and lowering the panels 12a-12d. A controller 46 may be provided anywhere on the vehicle V or perhaps even in a remote control for controlling the activation of motors 42, 44 and thus the collapsing of the members or panels 12a-12d, and ultimately cause their return to a home position, as shown in FIG. 1.

Although four panels 12a-12d are illustrated, it can be appreciated that fewer or more may be used. For instance, a single panel may be used for exposing all or a portion of the opening O. This single panel may be rotated by the first actuator 16 and caused to collapse and then return to the home or upright position by the second actuator 18. The panel or panels 12a-12d also need not fully rotate to a horizontal position relative to the support 14, as shown, but instead could assume an skewed or angled configuration and simply cascade over one another when collapsed.

Figure 10:
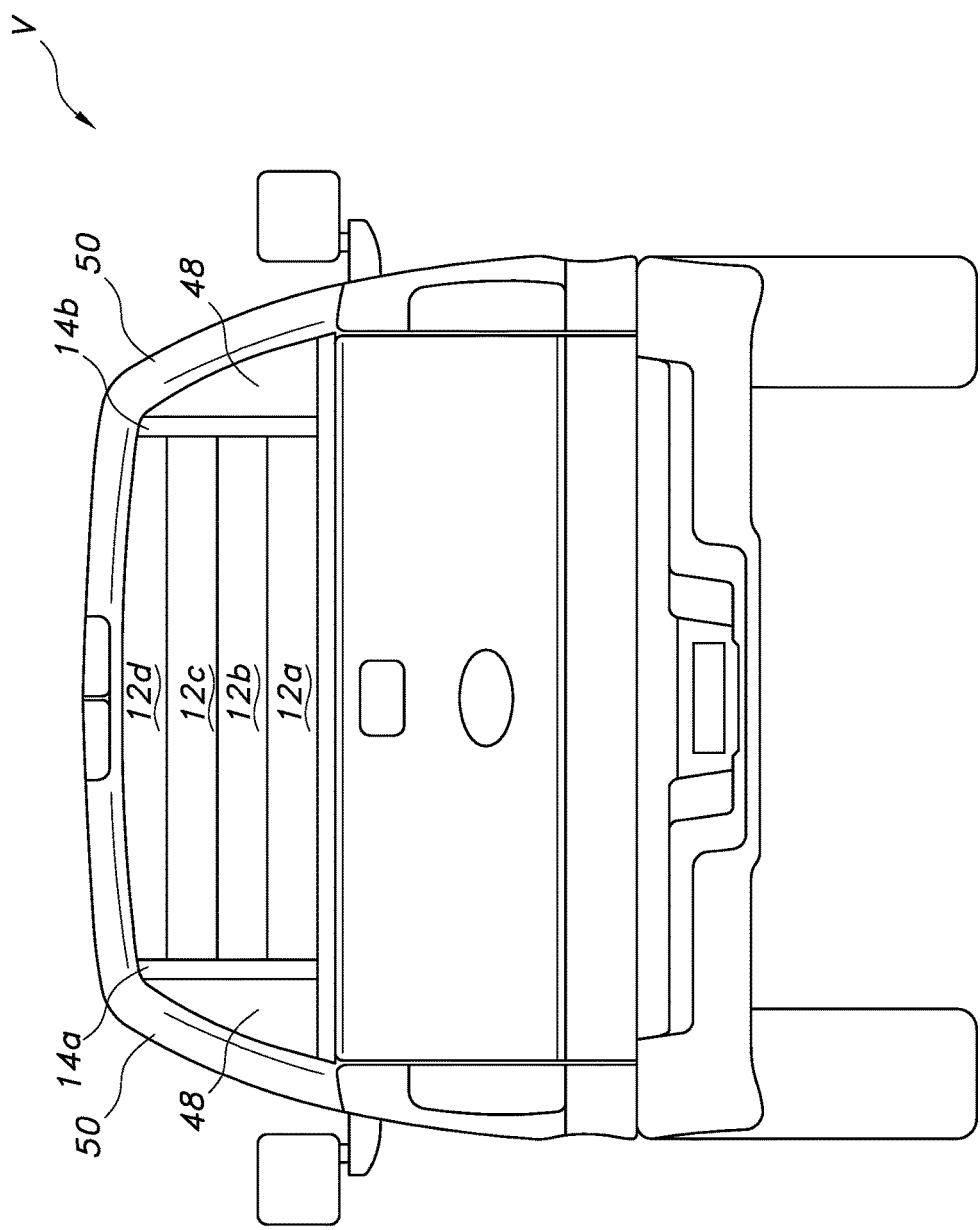
FIGS. 10-15 illustrate alternate embodiments of the collapsible cover.
Figure 11:
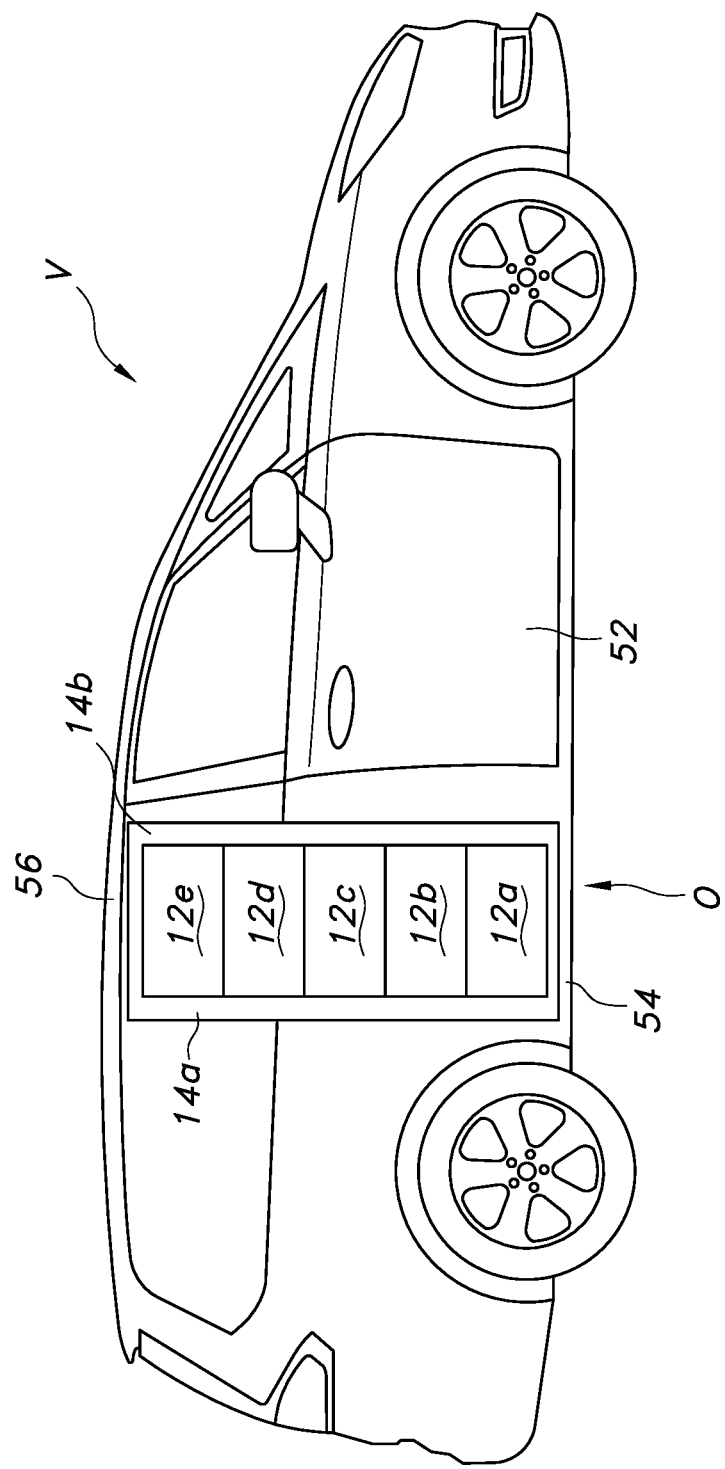

While the above described arrangement is used in connection with an opening forming a vehicle window along one or more sides of a pickup truck cab, it should be appreciated that the cover 10 may be used in other applications. For instance, the cover 10 may be used in a rear window opening O, as indicated in FIG. 10. To provide for the desired vertical movement of the panels 12a-12d within non-vertical pillars 50, the support members 14a, 14b may be provided along with separate side windows 48 for covering any gap between the support members and the adjacent pillar. As can be appreciated, the handle 32 if present may be accessible from the interior of the cab to allow for the driver or passengers to deploy or collapse the cover 10 as desired.

Likewise, the opening O may be one for accessing the passenger compartment, such as along a portion of the vehicle V rearward of a front passenger door 52 on a minivan or SUV, as. The cover 10 may extend from the lower support 54 of the vehicle to the upper support or roof 56. Five panels 12a-12e are shown, one or more of which may be transparent or translucent to admit light to create a window, but all could be opaque as well and thus form a door. The panels 12a-12e in the collapsed or lowered position may also be of a low profile (such as by being recessed relative to the interior floor) so as to allow the opening O to be easily traversed when climbing into the vehicle. FIG. 12 illustrates that the cover 10 may occupy a window opening O on the side of the vehicle V, and could be on the opposite side of a covering for a door opening (not shown).

Figure 13:
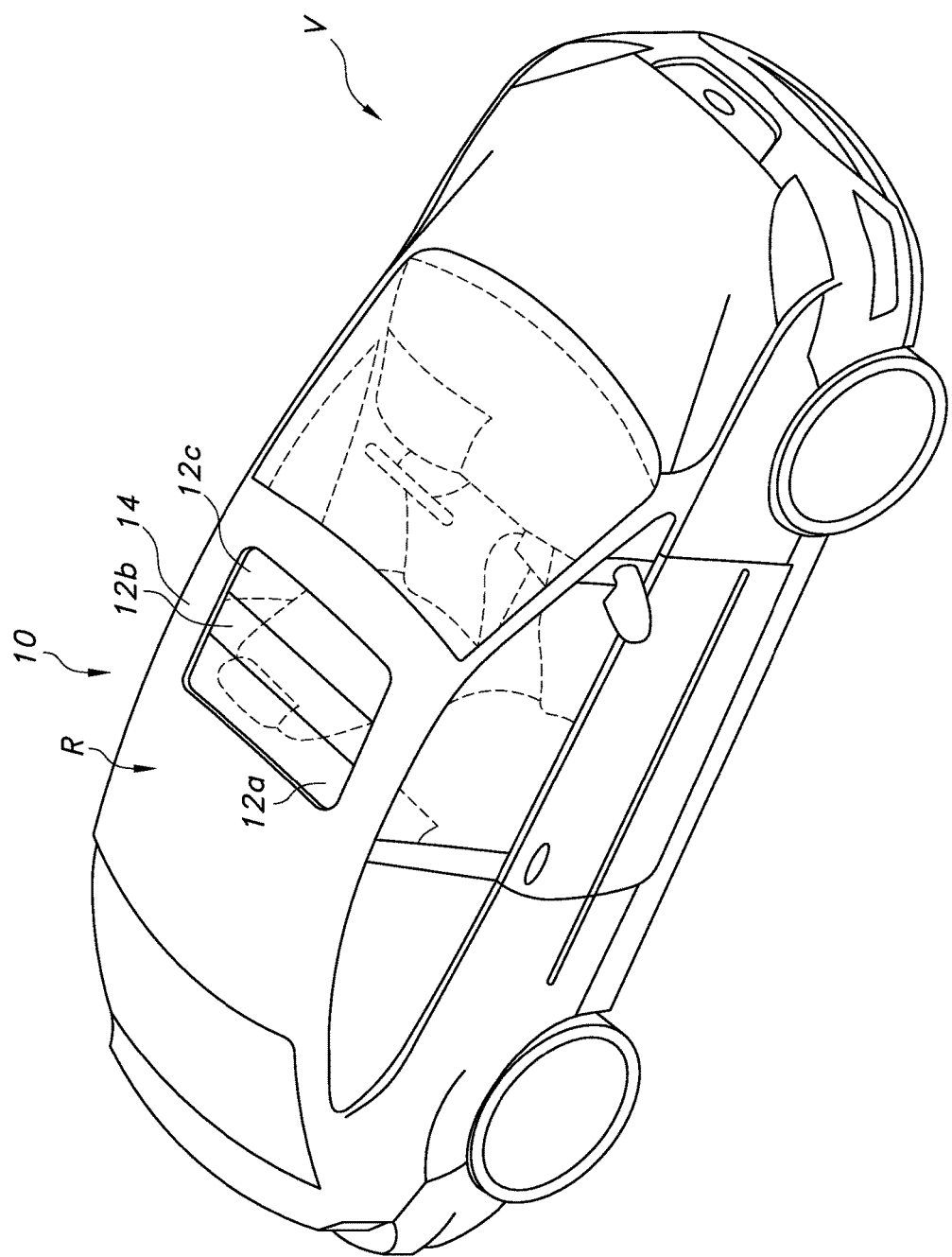
Figure 13A:
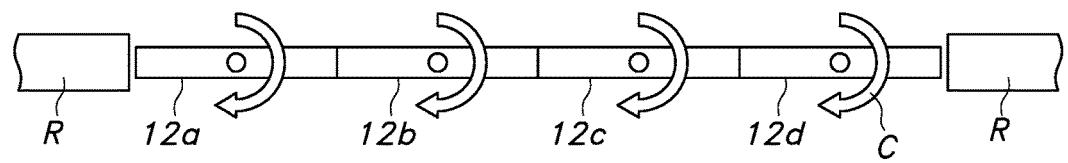
Figure 13B:
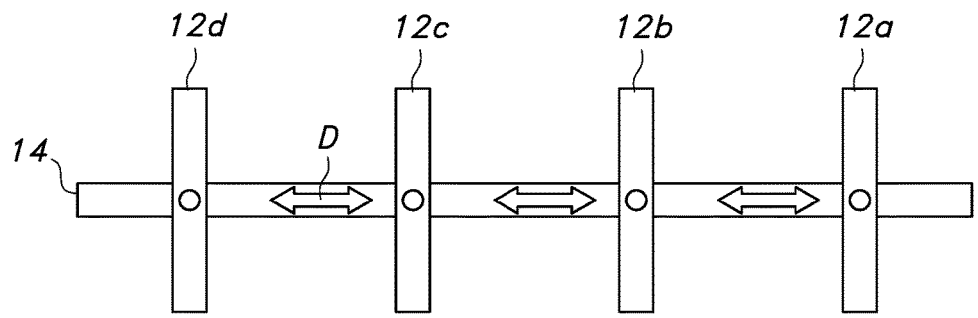
Figure 14A:
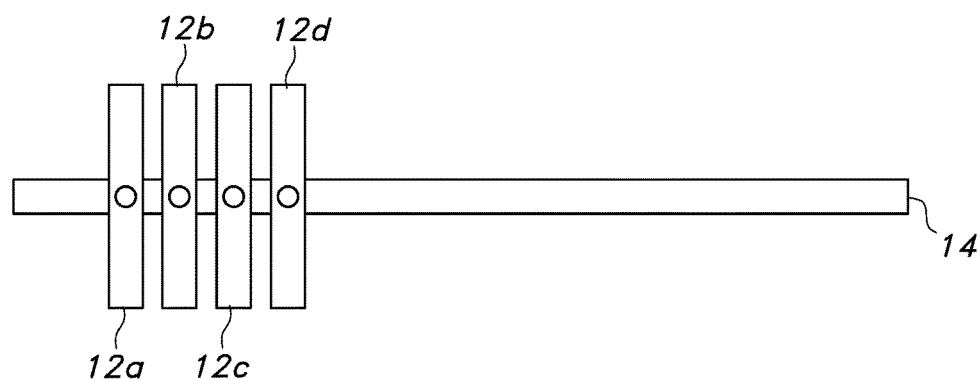
Figure 14:
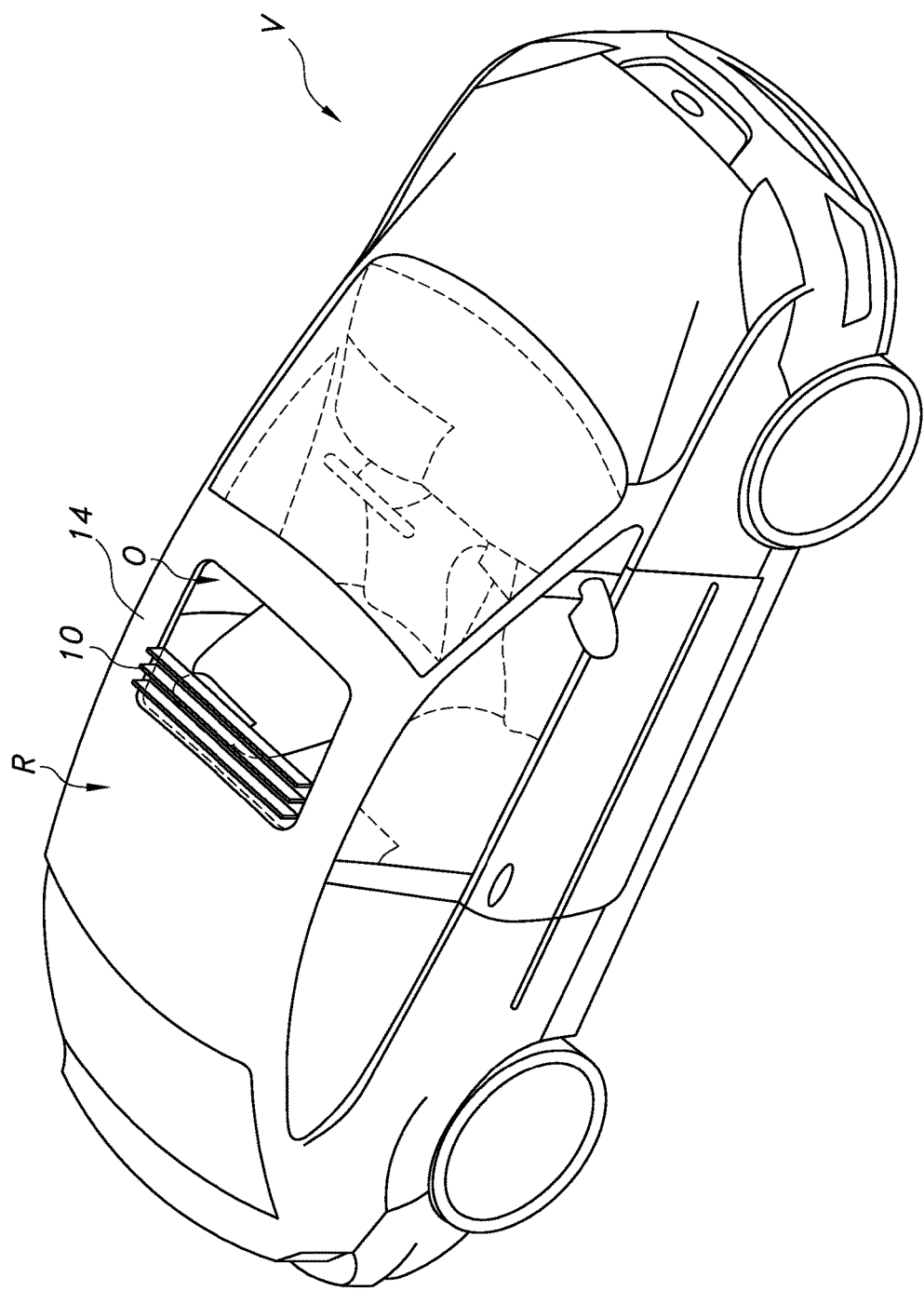
Figure 15:
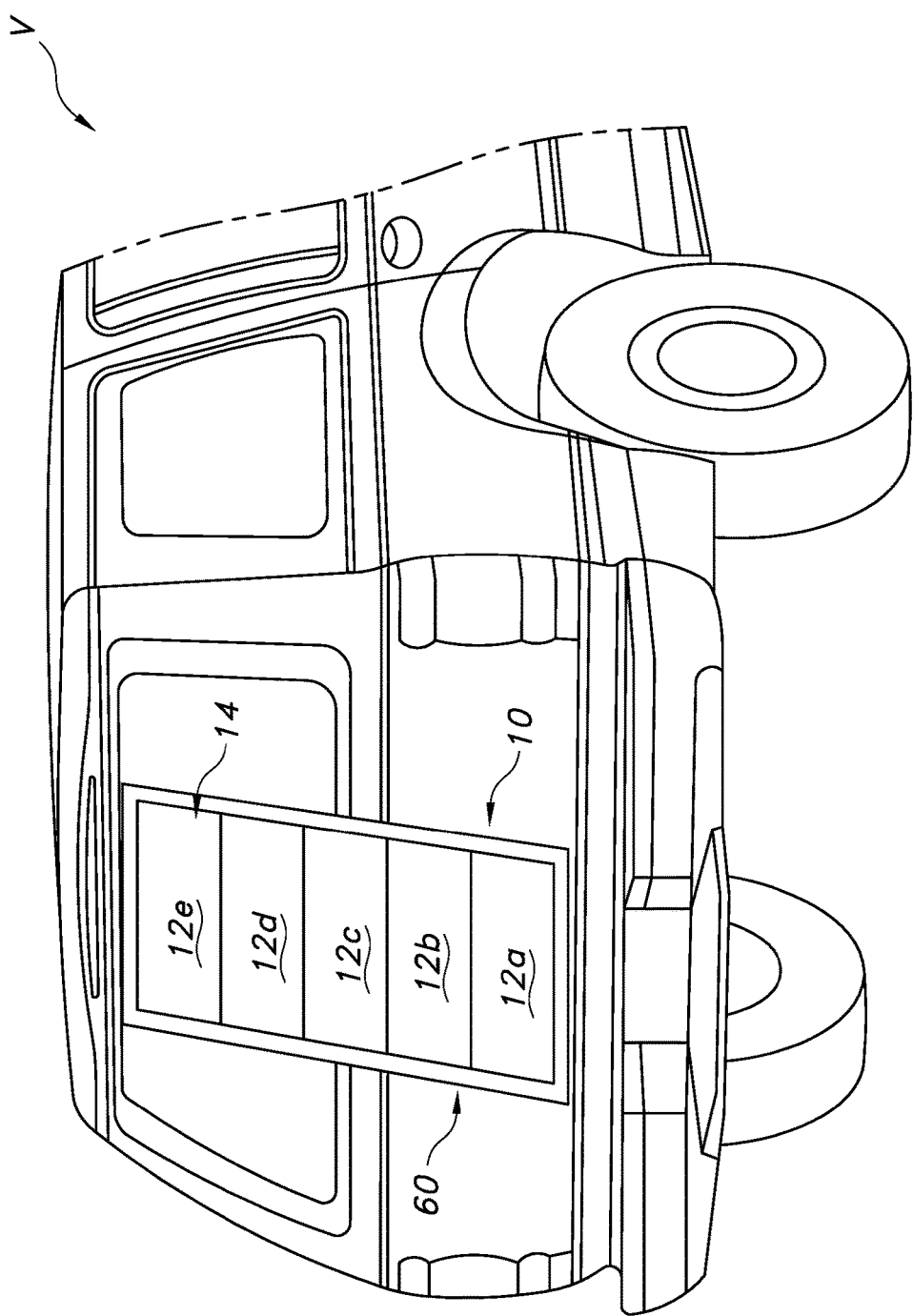

Another possible application of the cover 10 and one particularly adapted for the use of the translucent or transparent panels is in connection with a window in a vehicle roof R. Specifically, as shown in FIG. 13, the panels 12a-12c may be arranged substantially horizontally within the support 14 in a home condition (see FIG. 13a), and may be pivoted upwardly (FIG. 13b) and moved to the collapsed configuration (see FIG. 14a) to admit air and/or collapsed to fully expose the opening O (see FIG. 14). Likewise, the opening O may be one for receiving a liftgate 60 or hatch at the rear of a vehicle V, such as an SUV, with the cover 10 thus taking the place of (or forming part of) the liftgate for being raised and lowered.

In summary, numerous benefits are provided by the proposed arrangement for a collapsible cover 10 for a door or window opening in a vehicle V. For example, the cover 10 may be deployed and retracted without the need for being stored or recessed within a panel of the vehicle or otherwise. The cover 10 may also be manipulated to allow an object to pass through the corresponding opening without first removing the associated support 14. This may be achieved by moving a portion of the cover 10 in a plane generally parallel with a plane of an opening for receiving it. Consequently, efficiency of using the associated vehicle V or truck is greatly enhanced, especially in terms of opening and closing an associated door or window.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a vehicle including a window or door opening along a lateral side thereof;
   a collapsible cover for selectively closing and exposing the window or door opening, the cover comprising a plurality of members adapted for pivoting within the window or door opening and for translating to and fro relative to the opening, at least one of the plurality of members being at least partially transparent or translucent for admitting light through the window or door opening when closed; and a seal for sealing one of the plurality of members to a portion of the vehicle forming the opening, wherein the seal comprises interlocking bulb seals.

2. The apparatus of claim 1, wherein each of the plurality of members is mounted to a support for rotating between a closed position in alignment with the support and an open position transverse to the support.

3. The apparatus of claim 2, further including an actuator for moving the plurality of members along the support.

4. The apparatus of claim 2, further including an actuator adapted for rotating the plurality of members between an open position and a closed position.

5. The apparatus of claim 4, wherein the actuator comprises an endless loop connected to a handle associated with the support for translating the plurality of members relative to the window or door opening.

6. The apparatus of claim 1, further including:
at least one connector associated with the plurality of members; and
a guide for guiding the connector to lower the plurality of members and at least partially expose the opening.

7. The apparatus of claim 1, wherein at least another one of the plurality of members is opaque.

8. An apparatus, comprising:
a pick up truck including a cab having a window opening;
a cover comprising one or more panels for partially covering the window opening, the one or more panels adapted for rotating from an upright condition to a rotated condition and for moving in a vertical direction from a raised configuration to a collapsed configuration to at least partially expose the window opening; and
a seal for sealing one of the panels to an adjacent panel or a portion of the vehicle forming the window or door opening.

9. The apparatus of claim 8, further including an actuator for rotating the panel or panels.

10. The apparatus of claim 8, further including an actuator for collapsing the panel or panels.

11. The apparatus of claim 8, wherein the one or more of the panels are at least partially transparent or translucent.

12. The apparatus of claim 8, wherein the window opening is formed in a lateral side of the cab.

13. The apparatus of claim 1, wherein the window opening is formed in a rear side of the cab.

14. An apparatus for covering a door or window opening in a vehicle; and
a collapsible cover comprising a plurality of panels for partially covering the door or window opening, the plurality of panels adapted for rotating from an upright condition to a rotated condition and for moving in a vertical direction from a raised configuration to a collapsed configuration to at least partially expose the door or window opening, and further including a first seal on one of the plurality of panels for sealing the panel to a peripheral portion of the door or window opening, wherein each of the plurality of panels having a second seal for sealing with an adjacent panel, and wherein the second seal comprises interlocking bulb seals for sealing between the plurality of panels.

15. The apparatus of claim 1, wherein the window or door opening is for accessing a passenger compartment of the vehicle and is located along the lateral side of the vehicle rearward of a front passenger door.

* * * * *